Feb. 25, 1969  R. E. LARSON  3,429,108
AUTOMATIC-UNLOADING DUST VALVE FOR CENTRIFUGAL AIR CLEANERS
Original Filed Oct. 29, 1962
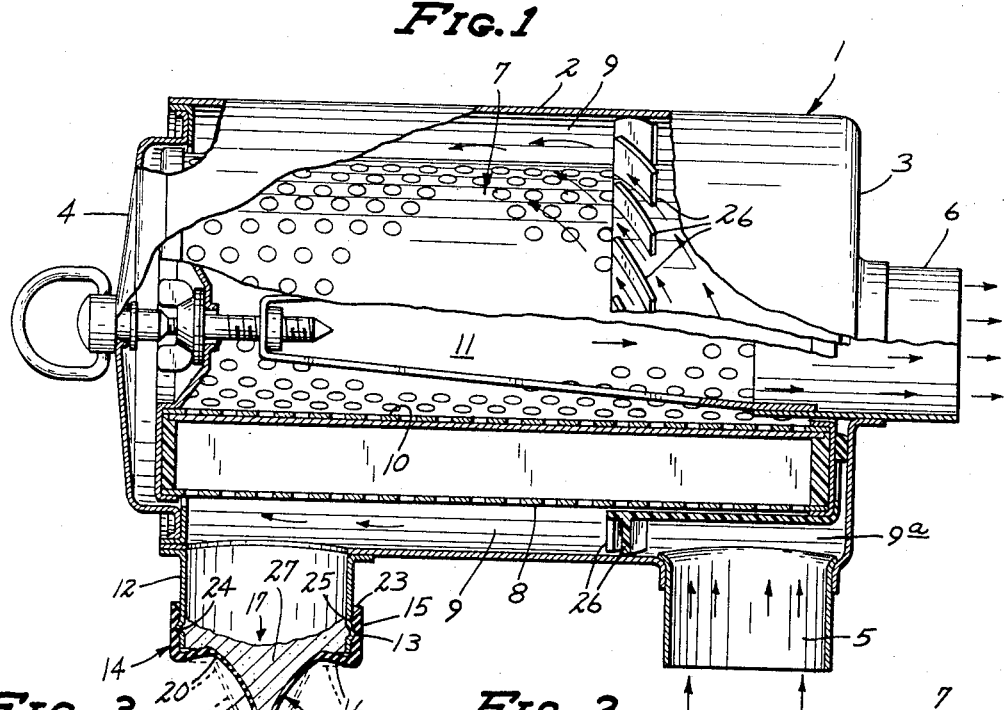
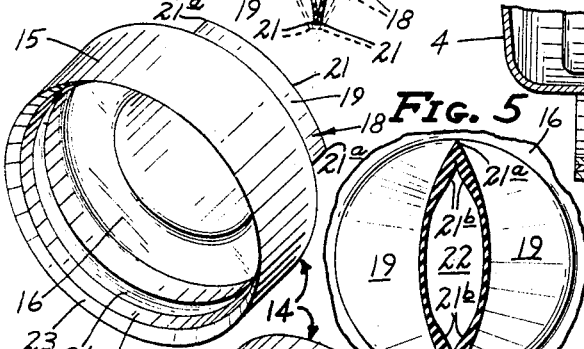
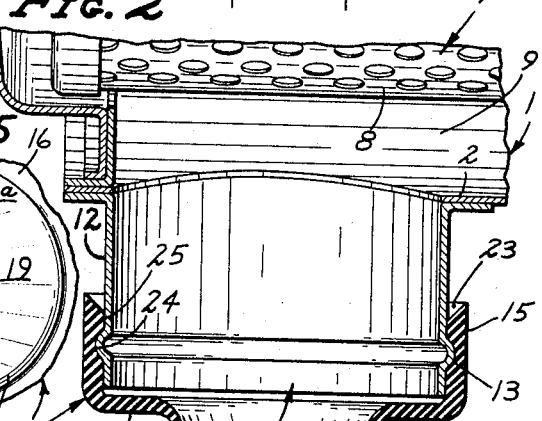
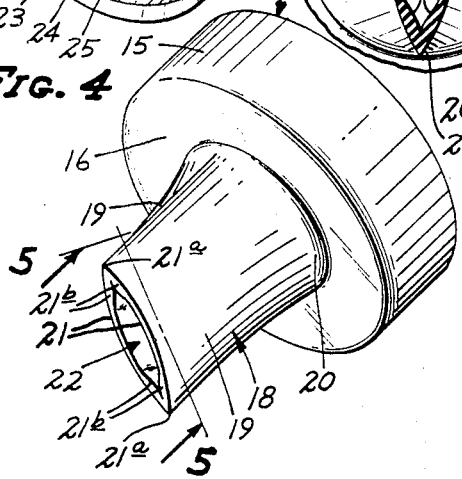
INVENTOR.
ROBERT E. LARSON
BY
Merchant, Merchant + Gould
ATTORNEYS United States Patent Office 3,429,108
Patented Feb. 25, 1969

3,429,108
AUTOMATIC-UNLOADING DUST VALVE FOR CENTRIFUGAL AIR CLEANERS
Robert E. Larson, Minneapolis, Minn., assignor to Donaldson Company, Inc., Minneapolis, Minn., a corporation of Delaware
Continuation of application Ser. No. 233,672, Oct. 29, 1962. This application Mar. 3, 1967, Ser. No. 620,556
U.S. Cl. 55—432  2 Claims
Int. Cl. B01d 45/06

ABSTRACT OF THE DISCLOSURE

An air cleaner for internal combustion engines and the like having a dust particle outlet with a tubular member extending outwardly therefrom having a resilient diaphragm affixed across the outer end, said diaphragm having an aperture therein with a resilient tubular discharge neck affixed thereto an intermittently movable between open and closed positions in response to changes in pressure conditions within said air cleaner for preventing the dust particles from bridging across said exit opening.

This application is a streamline continuation of application Ser. No. 233,672, filed Oct. 29, 1962, now abandoned.

My invention relates to air cleaners or filters for internal combustion engines and the like, and more particularly to improvements in automatic-unloading dust valves for centrifugal air cleaners of this type.

The primary object of my invention is the provision of an automatic-unloading dust valve for centrifugal air cleaners, which valve has an efficiency greater than any such valve heretofore produced.

A further object of my invention is the provision of a valve of the type generally above-described which may be molded from rubber-like material to define a depending discharge throat which is biassed open so as to terminate at its lower end in closely spaced lips which define a normally open lenticular discharge mouth, whereby dust collected within the discharge part and above said valve may be automatically, substantially entirely discharged therefrom under the action of gravity during periods when the air cleaner to which it is attached is not in operation.

A further object of my invention is the provision of a valve of the type immediately above described in which, under the action of partial vacuum within the air cleaner housing (caused by the inherent pulsations in an air intake system of an internal combustion engine to which it is attached), said normally open lips will be drawn together to close said mouth during operation of said engine so as to permit said air cleaner to operate at its fullest efficiency.

A further object of my invention is the provision of a device of the class above-described which, by virtue of its construction, prevents plugging by accumulated dust, chaff and lint. To this end my novel valve is provided with a relatively large intake end across which a flexible annular diaphragm-acting intermediate wall whose vertical pulsations under varying degrees of vacuum within the discharge part of the air cleaner housing to which it is attached functions to prevent bridging of accumulated dust within said port and thereabove, and also causes the lips of the integral, depending throat to be partially opened on repeated vertical pulsations of the diaphragm to periodically discharge therethrough small amounts of accumulated dust without impairing the efficiency of the air cleaner or filter.

A further object of my invention is the provision of a valve of the type generally above described which is so constructed as to enable one to install the same in operative position upon an air cleaner and remove same therefrom with a minimum of skill and with a minimum of time and effort.

A still further object of my invention is the provision of a device of the class described which is extremely inexpensive to produce and which needs but a minimum of servicing and which is extremely foolproof and durable.

The above and still further objects of my invention will become apparent from the following detailed specification, appended claims and attached drawings.

Referring to the drawings, wherein like reference characters indicate like parts or elements throughout the several views:

FIG. 1 is a view in side elevation of an air cleaner equipped with my novel valve, some parts being broken away and shown in section;

FIG. 2 is an enlarged fragmentary sectional view through the valve portion of FIG. 1;

FIG. 3 is a view in perspective of the mounting end of the valve structure of FIGS. 1 and 2;

FIG. 4 is a view in perspective showing the discharge end of my novel valve; and FIG. 5 is a view partly in section and partly in bottom elevation as seen from the line 5—5 of FIG. 4, some parts broken away.

Referring with greater particularly to the drawings, the numeral 1 indicates in its entirely a housing having a cylindrical side wall 2, an inner end wall 3 and a removable outer end wall 4.

The air cleaner shown is of the centrifugal type shown generally in the Anderson and Wolff patent No. 3,078,650, "Air Cleaner," and includes a radially disposed air inlet tube 5 adjacent the inner end wall 3 and an axial air outlet tube 6 carried by said inlet end wall 3. Housed within the cylindrical housing 1, concentrically therewith, is an annular gas-pervious filter element identified in its entirely by the numeral 7. Filter element 7 may be of the pleated type shown in said Anderson et al., application. In any event, it extends substantially the length of said housing 2, and its perforate radially outer wall 8 is spaced from the radially inner surface 2a of the cylindrical side wall 2 to define an annular axially extended air inlet passage 9; and its perforate inner wall 10 defines an axially extended air passage 11 which communicates with the air outlet tube 6. The arrows clearly indicate the travel of the air through the housing 1 and parts carried thereby.

In the Anderson et al., structure above referred to, the housing is vertically disposed and consequently a cup-like removable dust collection cap 15 is provided on its lower end. In my structure, however, the dust cap 15 is replaced by the removable end wall 4, and a depending annular discharge neck 12 is formed in the side wall 2 adjacent the outer end wall 4. Consequently, it is necessary that the housing 1 be horizontally disposed so that the dust accumulating on the outer end of the air inlet passage 9 will be deposited within said discharge neck 12 under the combined action of centrifugal force and gravity. Preferably and as shown, the discharge neck 12, adjacent its lower end, is provided with a radially outwardly projecting annular anchoring bead 13, for a purpose which will hereinafter become apparent.

My novel automatic-unloading dust valve is identified in its entirely by the numeral 14. Valve 14 is molded or otherwise formed from rubber-like material and includes an enlarged generally cylindrical endless anchoring flange 15 at its upper end, which is adapted to be stretched over the outer end portion of said discharge neck 12, an integrally formed radially inwardly extended annular diaphragm-acting flexible wall 16 on the outer end of said flange 15 and partially restricting the opening 17 defined by said discharge neck 12, having at its center an opening. A downwardly projecting discharge throat 18 is formed integrally with the radially inner limits of said diaphragm-acting wall 16 and surrounds the opening therein. It will be noted that the discharge throat 18 has opposite side portions 19 which are progressively relatively flattened so as to converge downwardly from the cross-sectionally substantially circular upper end portion 20, adjacent the diaphragm-acting wall 16, to the extreme lower end thereof, wherein they terminate in arcuate lips 21 which are oppositely and outwardly biassed to define a normally open lenticular discharge mouth 22, as shown particularly in FIG. 4.

Preferably and as shown, the flange 15 is outwardly flared at its upper end to permit telescoping attachment thereof on the discharge neck 12, as indicated at 23. Furthermore, the said flange 15 is provided with an annular groove 24 on its cylindrical inner surface 25 for the snug reception of the anchoring bead 13.

Operation

From the above description, it should be obvious that dust-laden air, entering the housing 1 through the radial air inlet tube 5 in the side wall 2, enters the inner end of the axially extended air passage 9, wherein centrifugal action is imparted thereto through the medium of the circumferentially spaced blades 26 as said air passes axially toward the outer end wall 4. Under this action the heavier particles of dust are caused to be separated out from the air stream and accumulate adjacent the outer end wall 4, wherein under the action of gravity, same are caused to drop into and accumulate within the discharge neck 12, as indicated by the numeral 27 in FIG. 1. During this period, as above explained, the opposite side portions 19 of the discharge throat 18 and the lips 21 which form the discharge mouth 22 are caused to assume the full-line position of FIG. 1 because of the partial vacuum within the housing 1. However, due to variations in this partial vacuum, a pulsating action is set up which imparts itself to the diaphragm-acting wall 16. This vertical pulsating action of the throat carrying diaphragm, combined with the weight of the accumulated dust within the discharge port and neck 12 and discharge throat 18 cause the lips 21 to be intermittently spread sufficiently to partially open the mouth 22 to periodically discharge small amounts of the accumulated dust, without in any manner impairing the efficiency of the filtering element 7 within the housing 1. Too much stress cannot be placed upon the importance of the vertical pulsating action of the diaphragm-acting wall 16 in bringing about the intermittent automatic unloading of the dust accumulated within the housing 1. In fact, it is this combined pulsating action of the flexible wall 16 and the side wall portions 19 of the discharge neck, which produces the intermittent partial opening and closing of the lips 21, of the throat 18 and thus partial discharge of accumulating dust which prevents bridging of the accumulated dust within the discharge neck 12. The relatively large area defined by the flange 15 as well as the upper end portion of the discharge throat 18, on the other hand, prevents plugging of the valve 14 by accumulated dust, chaff and lint.

Also, as above indicated, when the internal combustion engine (not shown) to which the housing 1 is attached is not running (and as as consequence there is no partial vacuum within the housing 1), the diaphragm-acting wall 16 and the side walls 19 return to their natural shape as indicated in FIG. 2, whereby to permit gravity discharge of any residual dust therewithin which may not have automatically passed therefrom due to pulsating action of the diaphragm-acting wall 16 and side walls 19 during operation of the air cleaner, above-described.

When on occasion it becomes necessary to open up the housing 1 for cleaning purposes to remove lint, chaff or the like therefrom, this may be done merely by stretching the flange 15 radially outwardly and imparting downward movements thereto.

As shown particularly in FIGS. 4 and 5, the lips 21 are shown as formed, at their points of joinder 21a at opposite ends of the mouth 22, to provide opposed relatively thickened diverging wall portions, as indicated at 21b. In view of the fact that the mouth 22 is vulcanized or formed in the open position of FIGS. 4 and 5, coupled with the fact that rubber tends to return to the position in which it was vulcanized, this construction greatly facilitates opening of the mouth 22 when the internal combustion engine to which my novel centrifugal cleaner 1 is attached is no longer in operating condition.

I claim:

1. In an air cleaner for internal combustion engines comprising a housing having an air inlet, an air outlet for connection to the intake of said engine, a filter supported in said housing between said inlet and outlet, and a dust collection and discharge port in said housing and spaced from said inlet and outlet, the improvement comprising:
    (1) a flexible diaphragm carried by and extending horizontally across said discharge port and having one side thereof responsive to pressure conditions within said housing, said diaphragm having an aperture therein;
    (2) a hollow throat member surrounding the aperture in said diaphragm and depending from the other side thereof,
    (3) lips at the free end of said throat member, and
    (4) means biasing said lips toward open position thereof to operate to discharge dust therethrough, whereby said lips and throat member are intermittently movable to alternately close said lips with fluctuations of said diaphragm on changes in pressure conditions within said housing.

2. In an air cleaner for internal combustion engines, comprising a housing having an air inlet, an air outlet for connection to the intake of said engine, a filter supported in said housing between said inlet and outlet, and a dust collection and discharge port defined by a tubular port member in said housing which discharge port is spaced from said inlet and outlet, the improvement being an integral dust unloader member comprising:
    (a) an annular flange for connecting said dust unloader member to said port member;
    (b) a flexible diaphragm connected at its periphery to said flange and extending generally normal to said flange radially inwardly; said diaphragm having a generally central aperture therein smaller than said discharge port; said diaphragm extending horizontally across said discharge port and being movably responsive to pressure conditions within said housing;
    (c) a resilient generally tubular elongated throat member connected at one end to said diaphragm around said aperture and extending outwardly of said discharge port generally normal to said diaphragm to a free end;
    (d) lips at the free end of said throat member;
    (e) said lips and throat member being formed to provide a lenticular opening at said lips and said lips and throat member being movable to intermittently open and close said opening;
    (f) said lips and throat member being formed to normally bias said lips to the open position; and
    (g) whereby said lips and throat member are intermittently movable to alternately open and close said opening with fluctuations of said diaphragm and throat member upon changes in pressure conditions within said housing as a result of pulsations of the engine.

(References on following page)

References Cited

UNITED STATES PATENTS

| | | | |
|---|---|---|---|
| 602,964 | 4/1898 | Van Gelder | 55—430 X |
| 816,460 | 3/1906 | Geisendorfer et al. | 55—430 X |
| 1,417,052 | 5/1922 | Gasteiger | 55—430 |
| 2,292,373 | 8/1942 | Groeniger | 137—525.1 X |
| 2,328,382 | 8/1943 | Langdon | 137—525.1 X |
| 2,352,642 | 7/1944 | Langdon | 137—525.1 |
| 2,446,967 | 8/1948 | Sykes | 222—203 X |
| 2,594,318 | 4/1952 | Langdon | 137—525.1 X |
| 2,646,905 | 7/1953 | Vincent | 222—203 X |
| 2,732,099 | 1/1956 | Davis | 222—203 X |
| 2,772,817 | 12/1956 | Jauch | 222—207 |
| 2,890,081 | 6/1959 | Jerrett | 302—59 |
| 2,889,963 | 6/1959 | Johnson | 222—203 X |
| 3,034,731 | 5/1962 | Chapin | 137—525.1 X |
| 3,098,455 | 7/1963 | McElroy et al. | 137—525.1 X |
| 3,167,089 | 1/1965 | Gordon | 137—525.1 X |
| 3,195,786 | 7/1965 | Vogt | 137—525.1 X |
| 3,214,102 | 10/1965 | Meyer | 222—490 X |
| 3,319,404 | 5/1967 | Lowther | 55—432 |

FOREIGN PATENTS

| | | |
|---|---|---|
| 449,976 | 7/1948 | Canada. |
| 851,133 | 10/1960 | Great Britain. |
| 149,699 | 4/1955 | Sweden. |

HARRY B. THORNTON, *Primary Examiner.*

DENNIS E. TALBERT, JR., *Assistant Examiner.*

U.S. Cl. X.R.

55—337, 457, 481, 510; 137—525.1; 222—203, 206